(12) United States Patent
Kato et al.

(10) Patent No.: US 11,208,201 B2
(45) Date of Patent: Dec. 28, 2021

(54) WING STRUCTURE FOR AN AIRCRAFT INCLUDING PLASMA ACTUATORS FOR CONTROLLING AIR FLOW THROUGH A SLOT, AND METHOD OF CONTROLLING THE SAME

(71) Applicant: SUBARU CORPORATION, Tokyo (JP)

(72) Inventors: Hiroki Kato, Tokyo (JP); Maki Kikuchi, Tokyo (JP); Kentaro Yoshida, Tokyo (JP); Nobuyuki Nakazato, Tokyo (JP); Tomofumi Iwamoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 357 days.

(21) Appl. No.: 16/373,873

(22) Filed: Apr. 3, 2019

(65) Prior Publication Data

US 2019/0322358 A1     Oct. 24, 2019

(30) Foreign Application Priority Data

Apr. 23, 2018 (JP) .............................. JP2018-082348

(51) Int. Cl.
*B64C 21/00* (2006.01)
*B64C 9/18* (2006.01)
*B64C 13/28* (2006.01)
*B64C 23/00* (2006.01)

(52) U.S. Cl.
CPC ................ *B64C 21/00* (2013.01); *B64C 9/18* (2013.01); *B64C 13/28* (2013.01); *B64C 23/005* (2013.01)

(58) Field of Classification Search
CPC .......... B64D 9/18; B64D 13/28; B64D 21/00; B64D 21/02; B64D 21/06; B64D 23/005
USPC ....................................................... 244/203
See application file for complete search history.

(56) References Cited

U.S. PATENT DOCUMENTS

| | | | | |
|---|---|---|---|---|
| 3,724,784 A * | 4/1973 | Ohain | ................... | B64C 23/005 244/207 |
| 5,320,309 A * | 6/1994 | Nosenchuck | ........... | B64C 21/00 244/205 |
| 5,884,872 A * | 3/1999 | Greenhalgh | .............. | B64C 9/30 244/201 |
| 6,467,733 B1 * | 10/2002 | Young | ....................... | B64C 9/16 244/215 |
| 7,624,941 B1 * | 12/2009 | Patel | ....................... | F42B 10/38 244/3.22 |
| 8,016,246 B2 * | 9/2011 | Schwimley | ............. | B64C 21/00 244/205 |
| 8,226,047 B2 * | 7/2012 | Gupta | ................... | B64C 23/065 244/199.3 |
| 9,376,203 B2 * | 6/2016 | Tieys | ........................ | B64C 3/48 |
| 9,821,862 B2 * | 11/2017 | Han | ..................... | H05H 1/2406 |

(Continued)

FOREIGN PATENT DOCUMENTS

JP     2008-290710 A     12/2008
JP     2016-056814 A     4/2016

*Primary Examiner* — Brady W Frazier
(74) *Attorney, Agent, or Firm* — Troutman Pepper Hamilton Sanders LLP

(57) ABSTRACT

A wing structure for an aircraft includes a stationary wing, a movable wing and at least one plasma actuator. The movable wing is configured to have a slot between the movable wing and the stationary wing. The at least one plasma actuator is configured to control air flow through the slot.

12 Claims, 3 Drawing Sheets

(56) References Cited

U.S. PATENT DOCUMENTS

| | | | |
|---|---|---|---|
| 10,017,243 B2* | 7/2018 | Moser | B64C 9/16 |
| 2006/0060723 A1* | 3/2006 | Greenblatt | B64C 21/08 |
| | | | 244/207 |
| 2007/0098554 A1* | 5/2007 | Lorin De La Grandmaison | |
| | | | B64C 27/615 |
| | | | 416/131 |
| 2009/0212164 A1 | 8/2009 | Osborne et al. | |
| 2009/0302169 A1* | 12/2009 | Wright | B64C 9/24 |
| | | | 244/214 |
| 2010/0224733 A1* | 9/2010 | Wood | B64C 23/005 |
| | | | 244/205 |
| 2010/0329838 A1* | 12/2010 | Greenblatt | F04D 29/687 |
| | | | 415/1 |
| 2012/0280501 A1* | 11/2012 | Tanaka | F03D 17/00 |
| | | | 290/44 |

\* cited by examiner

WING STRUCTURE FOR AN AIRCRAFT INCLUDING PLASMA ACTUATORS FOR CONTROLLING AIR FLOW THROUGH A SLOT, AND METHOD OF CONTROLLING THE SAME

CROSS-REFERENCE TO RELATED APPLICATIONS

The present application claims priority from Japanese Patent Application No. 2018-082348 filed on Apr. 23, 2018, the entire contents of which are hereby incorporated by reference.

BACKGROUND

The disclosure relates to a wing structure, a method of controlling the wing structure, and an aircraft.

Movable wings such as ailerons, rudders, elevators, flaps, spoilers, and flaperons are known as components for controlling air flow around wings of aircraft, such as the main wings and the tail wings. The orientation of an aircraft is controlled by driving actuators to vary the steering angle of the movable wing.

Further, in recent years, studies have been done on the use of plasma actuators (PA) as auxiliary devices for controlling air flow around aircraft wings (see, for example, Japanese Unexamined Patent Application Publication (JP-A) No. 2016-056814 and JP-A No. 2008-290710). A practical application for a plasma actuator mounted on an aircraft wing is DBD-PA, which uses dielectric barrier discharges (DBD) to shape air flow.

DBD-PA is a plasma actuator in which electrodes are arranged with a dielectric in-between, and plasma is generated only on one side of the dielectric by applying a high AC voltage between the electrodes. By using a DBD-PA, through controlling the plasma, delamination of air is suppressed and airflow can be changed. As a result, by attaching DBD-PAs to wings, attempts have been made to omit movable wings such as auxiliary wings and flaps. In other words, DBD-PAs are expected to provide an alternative to control surfaces of aircraft.

SUMMARY

An aspect of the present disclosure provides a wing structure a wing structure for an aircraft. The wing structure includes a stationary wing, a movable wing configured to have a slot between the movable wing and the stationary wing, and at least one plasma actuator configured to control air flow through the slot.

An aspect of the present disclosure provides an aircraft including the wing structure described above.

An aspect of the present disclosure provides a method for controlling a wing structure of an aircraft. The aircraft includes a stationary wing, a movable wing disposed so as to form a fixed slot between the movable wing, and a stationary wing and at least one plasma actuator. The method includes controlling air flow through the slot with the at least one plasma actuator.

BRIEF DESCRIPTION OF THE DRAWINGS

The accompanying drawings are included to provide a further understanding of the disclosure and are incorporated in and constitute a part of this specification. The drawings illustrate example implementations and, together with the specification, serve to explain the principles of the disclosure.

DETAILED DESCRIPTION

Figure 1:
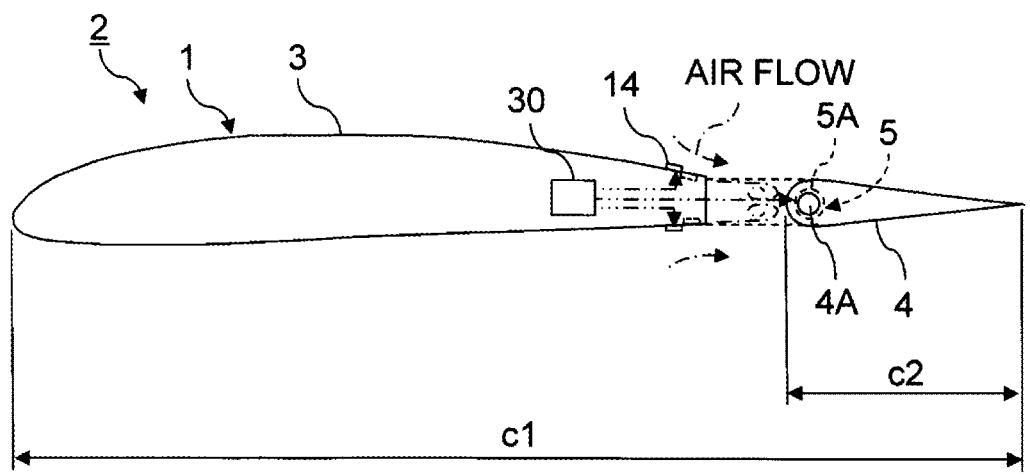
FIG. 1 is a cross-sectional view illustrating a configuration of a wing structure according to an embodiment of the disclosure.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. One type of flap, a slotted flap, is the flap that is attached such that a slot is formed between the flap and a stationary wing. When the slotted flap is extended, air flow is formed from the lower surface to the upper surface of the wing through a slot formed between the stationary wing and the slotted flap. The air flow from the lower surface to the upper surface of the slotted flap can suppress delamination of air at the upper surface of the slotted flap.

In the case of a movable wing for directing air into the slot formed between the movable wing and the stationary wing as typified by a slotted flap, in addition to an actuator for controlling the steering angle of the movable wing, an actuator for extending the movable wing are also required. As a result, the weight of the aircraft may increase.

Accordingly, it is desirable to reduce the weight of the wing structure and the aircraft which have a movable wing for directing air into a slot between the movable wing and a stationary wing.

(Configuration and Function)

Figure 2:
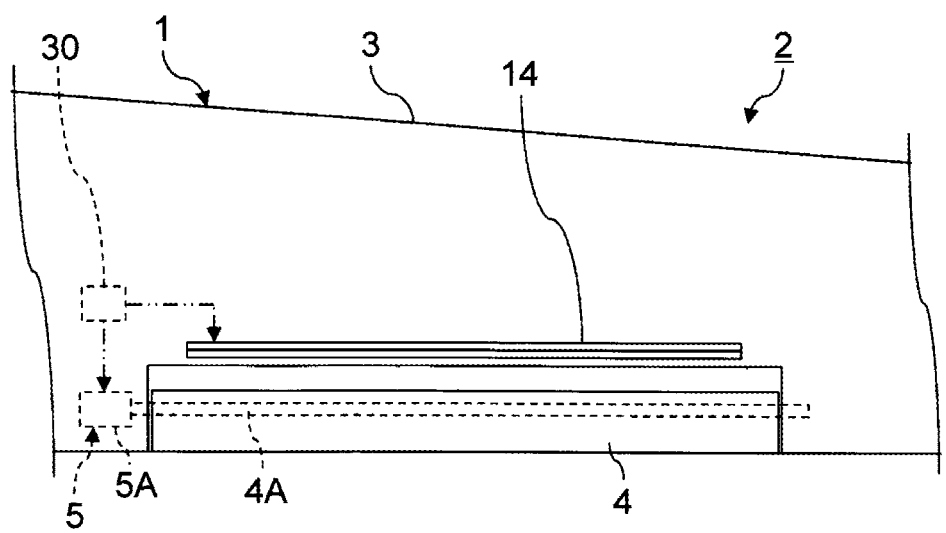
FIG. 2 is a partial top view of the wing structure illustrated in FIG. 1.

FIG. 1 is a cross-sectional view illustrating a configuration of a wing structure according to an embodiment of the disclosure, and FIG. 2 is a partial top view of the wing structure illustrated in FIG. 1.

Figure 3:
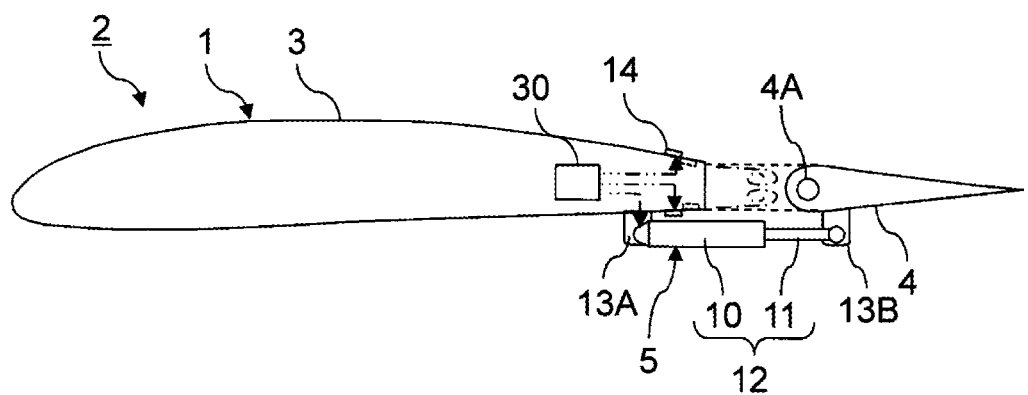
FIG. 3 is a diagram illustrating another configuration example of the actuator illustrated in FIG. 1.

The wing structure 1 is a structure such as a main wing and a tail wing for an aircraft 2. Thus, the wing structure 1 is provided with the aircraft 2. The wing structure 1 has a stationary wing 3 and a movable wing 4. The movable wing 4 is disposed in such a manner that a slot is always formed between the movable wing 4 and the stationary wing 3. Examples of a movable wing 4 include an aileron, a rudder, an elevator, a flap, a spoiler, a flaperon. FIGS. 1 to 3 illustrate an example in which the wing structure 1 is a main wing structure and the movable wing 4 is a flap. One of the movable wings 4, the flap, is a high-lift device that is steered during takeoff and landing of the aircraft.

The movable wing 4 has an actuator 5 for controlling the steering angle of the movable wing 4. Unlike slotted flaps which forms the slot by expanding with a conventional extending mechanism, the movable wing 4 is coupled to the stationary wing 3 configured to have a constant slot between the movable wing 4 and the stationary wing 3. Therefore, unlike conventional slotted flaps or the like, the movable wing 4 does not require an extending mechanism for extending the movable wing 4. Consequently, the movable wing 4 is mechanically controlled only by the actuator 5 for controlling the steering angle of the movable wing 4.

In the example illustrated in FIGS. 1 and 2, the actuator 5 is configured by a motor 5A that rotates a rotating shaft 4A for changing the steering angle of the movable wing 4. That is, the output shaft of the motor 5A is connected to the rotating shaft 4A of the movable wing 4. Therefore, the steering angle of the movable wing 4 is changed by rotation of the motor 5A. However, the configuration of the actuator 5 is not limited to this configuration, while the actuator 5 having another configuration may be also employed.

FIG. 3 is a diagram illustrating another configuration example of the actuator 5 illustrated in FIG. 1.

As illustrated in FIG. 3, the actuator 5 can also be configured by connecting, with a power cylinder 12 in which a rod 11 moves with respect to a cylinder tube 10, a first arm 13A fixed to the stationary wing 3, such as a horn arm or an L-shaped arm, and a second arm 13B fixed to the movable wing 4.

The wing structure 1 has at least one plasma actuator 14 as a component for controlling air flow, in addition to the movable wing 4 which is mechanically driven by the actuator 5 as described above. The plasma actuator 14 is a flow control device for controlling air flow through the slot between the movable wing 4 and the stationary wing 3.

Figure 4:
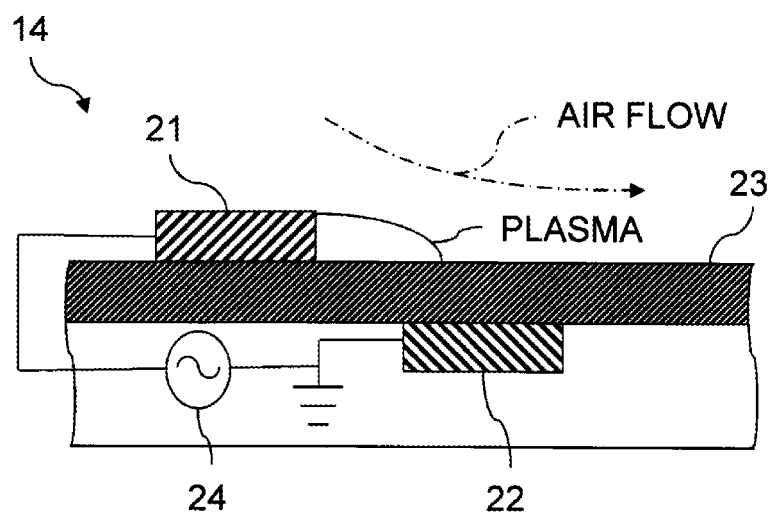
FIG. 4 is a diagram illustrating the principle of the plasma actuator illustrated in FIG. 1.

FIG. 4 is a diagram illustrating the principle of the plasma actuator 14 illustrated in FIG. 1.

The plasma actuator 14 includes a first electrode 21, a second electrode 22, a dielectric 23, and an alternating current (AC) power supply 24. The first electrode 21 and the second electrode 22 are disposed so as to be shifted with respect to each other with the dielectric 23 interposed therebetween forming a discharge area. The first electrode 21 is disposed so as to be exposed to a space in which air flow is to be induced. On the other hand, the second electrode 22 is covered with a dielectric 23 so as not to be exposed to the space in which air flow is to be induced. The second electrode 22 is grounded to the fuselage of the aircraft 2. An AC voltage is applied between the first electrode 21 and the second electrode 22 by the AC power supply 24.

When the AC power supply 24 is operated to apply an AC voltage between the first electrode 21 and the second electrode 22, plasma composed of electrons and positive ions is generated in the discharge area formed on the surface of the dielectric 23 on which the first electrode 21 is disposed. As a result, air flow toward the surface of the dielectric 23 is induced by the plasma. The plasma actuator 14, which causes a dielectric barrier discharge by interposing the dielectric 23 between the first electrode 21 and the second electrode 22, is called a dielectric barrier discharge plasma actuator, or DBD-PA.

The first electrode 21 and the second electrode 22 constituting the plasma actuator 14 may be formed in a thin film shape. Therefore, the plasma actuator 14 can be used by being attached to the surface of the movable wing 4 or embedded in a surface layer serving as an attachment position.

The number and mounting position of plasma actuators 14 can be determined by wind tunnel tests or simulations so that an appropriate air flow can be formed in the slot between the movable wing 4 and the stationary wing 3. In the example illustrated in FIGS. 1 and 2, one plasma actuator 14 is disposed on the upper surface of the stationary wing 3, and one plasma actuator 14 is disposed on the lower surface of the stationary wing 3. That is, one plasma actuator 14 is attached to the trailing edge on the upper surface of the stationary wing 3 and one plasma actuator 14 is attached to the trailing edge on the lower surface of the stationary wing 3 so that an appropriate air flow can be formed through the slot between the movable wing 4 and the stationary wing 3.

In this manner, the wing structure 1 has a plasma actuator 14 in addition to the movable wing 4 as a device for controlling air flow. Accordingly, the wing structure 1 has a control device 30 for controlling the movable wing 4 and the plasma actuator 14. The control device 30 may be configured with an electrical circuit that generates and outputs control signals as electrical signals. Further, when the actuator 5 for driving the movable wing 4 is hydraulic or pneumatic, the control device 30 can be configured to use a hydraulic pressure signal circuit or a pneumatic signal circuit so that a control signal can be generated and outputted as a hydraulic pressure signal or a pneumatic signal, respectively.

The steering angle of the movable wing 4 is adjusted with control amounts of the actuator 5. Therefore, the control device 30 outputs a control signal to the actuator 5 to instruct the actuator 5 to move the steering angle of the movable wing 4 by a certain control amount. On the other hand, the plasma actuator 14 is controlled by the presence or absence of an AC voltage and the waveform of the AC voltage applied by the AC power supply 24 between the first electrode 21 and the second electrode 22. Therefore, in order to control the operating condition of the plasma actuator 14, a control signal indicating the presence or absence of the AC voltage applied by the AC power supply 24 between the first electrode 21 and the second electrode 22 and the waveform of the AC voltage are outputted from the control device 30 to the AC power supply 24.

The movable wing 4 and the plasma actuator 14 may be coupled with each other under the control of the control device 30. That is, under the control of the control device 30, the plasma actuator 14 may be operated under conditions that are appropriate for the steering angle of the movable wing 4. As a practical example, the steering angle of the movable wing 4 is kept zero as illustrated in FIG. 1 to maintain the lift force of the wing structure 1 during cruising of the aircraft 2.

When the steering angle of the movable wing 4 is zero, both the plasma actuator 14 disposed on the upper surface of the stationary wing 3 and the plasma actuator 14 disposed on the lower surface of the stationary wing 3 is operated by the control device 30. The plasma actuator 14 disposed on the upper surface of the stationary wing 3 and the plasma actuator 14 disposed on the lower surface of the stationary wing 3 can form air flow for preventing air from flowing through the slot between the stationary wing 3 and the movable wing 4. That is, by forming an air curtain for preventing air flow through the slot between the stationary wing 3 and the movable wing 4, it is possible to reduce air drag which is caused by air flowing between the stationary wing 3 and the movable wing 4.

On the other hand, even when the movable wing 4 is steered to assume a non-zero positive or negative steering angle, the effect of the control surface can be improved by operating the plasma actuator 14 disposed at a suitable position.

Figure 5:
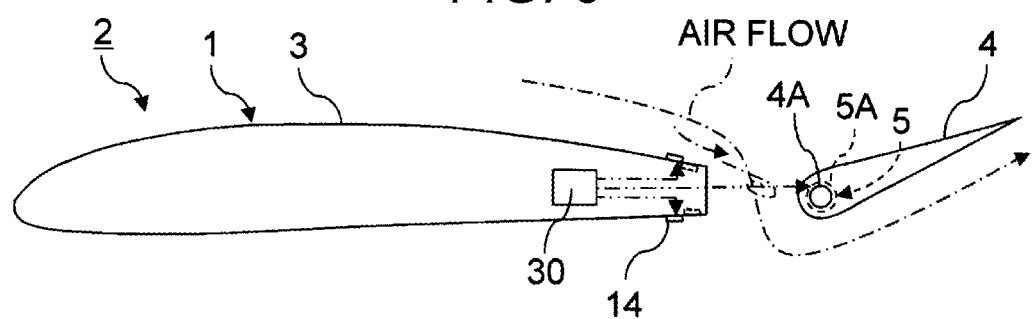
FIG. 5 is a cross-sectional view of the movable wing illustrated in FIG. 1 with a negative steering angle.

FIG. 5 is a cross-sectional view of the wing structure 1 illustrated in FIG. 1 with the movable wing 4 having a negative steering angle.

As illustrated in FIG. 5, when the steering angle of the movable wing 4 is negative, the plasma actuator 14 disposed on the upper surface of the stator blade 3 is operated by the control device 30 while the plasma actuator 14 disposed on the lower surface of the stationary wing 3 is prevented from operating. Then, by the operation of the plasma actuator 14 disposed on the upper surface of the stationary wing 3, it is possible to form air flow from the upper surface of the stationary wing 3 through the slot toward the lower surface of the movable wing 4. As a result, energy due to the air flow is supplied to the lower surface of the movable wing 4, and an effect of suppressing delamination of air on the lower surface of the movable wing 4 is obtained.

Figure 6:
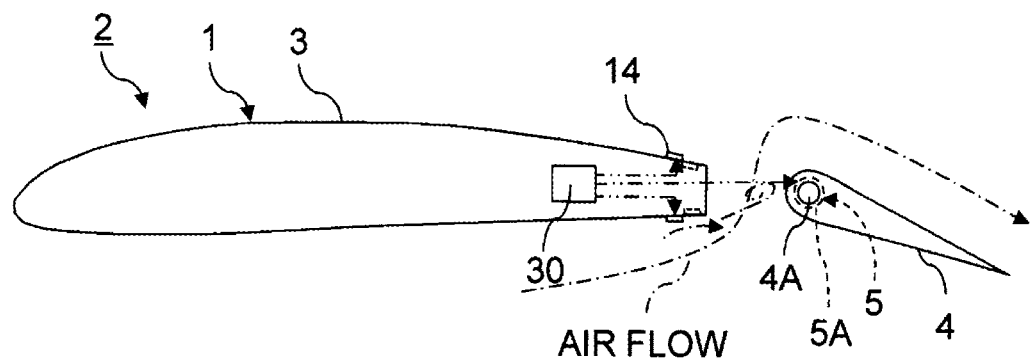
FIG. 6 is a cross-sectional view of the wing structure illustrating a state in which the steering angle of the movable wing illustrated in FIG. 1 is positive.

FIG. 6 is a cross-sectional view of the movable wing 4 illustrated in FIG. 1 with a positive steering angle.

As illustrated in FIG. 6, when the steering angle of the movable wing 4 is positive, the plasma actuator 14 disposed on the lower surface of the stationary wing 3 can be operated by the control device 30 while the plasma actuator 14 disposed on the upper surface of the stationary wing 3 is prevented from operating. Then, by the operation of the plasma actuator 14 disposed on the lower surface of the stationary wing 3, it is possible to form air flow from the lower surface of the stationary wing 3 through the slot toward the upper surface of the movable wing 4. As a result, energy due to the air flow is supplied to the upper surface of the movable wing 4, and an effect of suppressing delamination of air on the upper surface of the movable wing 4 is obtained.

The waveform of the AC voltage applied by the AC power supply 24 between the first electrode 21 and the second electrode 22 of each plasma actuator 14 can be determined by wind tunnel tests or simulations so that a suitable air flow is formed. It has been confirmed by wind tunnel tests and the like that burst waveforms, in addition to continuous waveforms, are effective as waveforms for the AC voltage from the AC power supply 24 applied between the first electrode 21 and the second electrode 22 of the plasma actuator 14.

Figure 7:
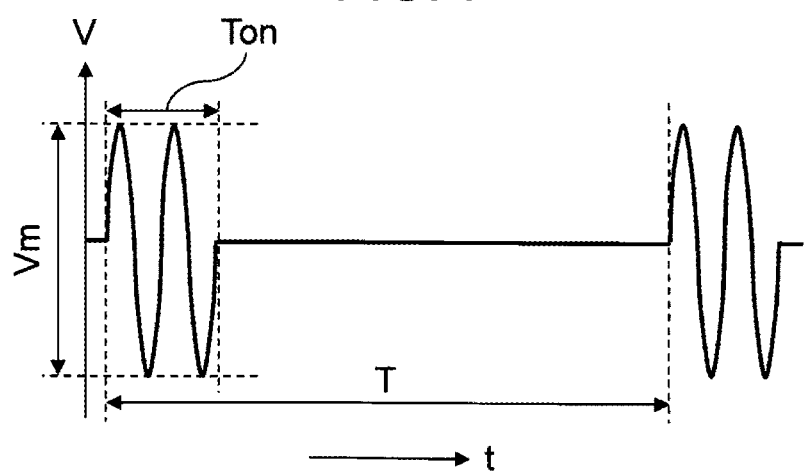
FIG. 7 is a graph illustrating a waveform of a typical burst wave.

FIG. 7 is a graph illustrating a waveform of a typical burst wave.

In FIG. 7, the vertical axis represents voltage V, and the horizontal axis represents time t. As illustrated in FIG. 7, the burst wave is a wave which repeats a cycle, at a constant burst period T, consisting of a period in which the amplitude varies and a period in which the amplitude does not vary. Accordingly, when the waveform of the AC voltage is a burst wave, the period Ton in which the AC voltage of the amplitude Vm is continuously applied is intermittently repeated with a burst period T. The ratio Ton/T of the period Ton, in which the AC voltage is applied, to the burst period T corresponds to the duty ratio and is called a burst ratio BR.

Therefore, waveform parameters, such as a burst period T and a burst ratio BR which are suitable for forming a target air flow by operation of the plasma actuator 14, can be obtained in advance by wind tunnel tests or simulations and can be stored in a database. That is, the control device 30 can be provided with a storage device for storing information, such as a table or a function indicating relationships between the air flow to be formed by operation of the plasma actuator 14 and the AC voltage waveforms to be applied between the first electrode 21 and the second electrode 22 of the plasma actuator 14. Thus, the waveform of the AC voltage applied between the first electrode 21 and the second electrode 22 of the plasma actuator 14 can be automatically controlled by the control device 30. Of course, the operator of the aircraft 2 may manually switch the plasma actuator 14 between the ON state and the OFF state.

When the burst frequency f, which is the inverse of the burst period T, or the burst period T, is nondimensionalized and, it is possible to determine an appropriate burst period T or burst frequency f by a shared wind tunnel test or simulation even if the shape of the wing structure 1 or the air flow velocity is different. For example, the burst frequency f can be nondimensionalized by referencing to the chord length c1 of the wing structure 1 or the control surface length c2 of the movable wing 4, which is defined as illustrated in FIG. 1, and the mainstream velocity U.

Specifically, the burst frequency F1, which is nondimensionalized by the chord length c1 of the wing structure 1 and the mainstream velocity U, is expressed by Equation (1).

$$F1=(1/T)/(U/c1)=f/(U/c1) \quad (1)$$

On the other hand, the burst frequency F2, which is nondimensionalized by the control surface length c2 of the movable wing 4 and the mainstream velocity U, is expressed by Equation (2).

$$F2=(1/T)/(U/c2)=f/(U/c2) \quad (2)$$

Accordingly, it is possible to determine the AC voltage waveform to be applied between the first electrode 21 and the second electrode 22 of the plasma actuator 14 based on a burst waveform with the burst frequency F1, F2 or burst period, which nondimensionalized by the chord length c1 of the wing structure 1, composed of the movable wing 4 and the stationary wing 3, or the control surface length c2 of the movable wing 4. Thereby, it is possible to set the shared nondimensionalized burst frequency F1, F2 or burst period regardless of the chord length c1 of the wing structure 1 or the control surface length c2 of the movable wing 4. Also, by dimensionalizing by the mainstream velocity U, the shared nondimensionalized burst frequency F1, F2 or burst period can be set regardless of the mainstream velocity U.

As described above, the wing structure 1, the method for controlling the wing structure 1, and the aircraft 2 control air flow through the slot with at least one plasma actuator 14 by forming a constant slot between the movable wing 4 and the stationary wing 3.

(Effect)

Therefore, with the wing structure 1, the method for controlling the wing structure 1, and the aircraft 2, the weight of the movable wing 4 is reduced. That is, with the wing structure 1, the method for controlling the movable wing 4, and the aircraft 2, the need of the extending mechanism provided with the conventional slotted flap can be eliminated. Therefore, an actuator for extending the movable wing 4 is not necessary, and the movable wing 4 can be steered with only the actuator 5 for controlling the steering angle.

Moreover, by appropriately operating the plasma actuator 14 in accordance with the steering angle of the movable wing 4, it is possible not only to eliminate the adverse effects caused by repeatedly forming a slot between the movable wing 4 and the stationary wing 3 but also to improve the efficiency of the movable wing 4 when the steering angle is used.

Other Embodiments

While a specific example has been described above, the described embodiment is only for the purpose of demonstration and is not intended to limit the scope of the disclosure. The novel method and apparatus described herein may be embodied in a variety of other manners. Various omissions, substitutions, and changes may be made in the manner of the method and apparatus described herein without departing from the spirit of the disclosure. The appended claims and their equivalents include such various forms and modifications as fall within the scope and spirit of the disclosure.

The invention claimed is:

1. A wing structure used for an aircraft, comprising:
   a stationary wing;
   a movable wing disposed so as to form a slot between the movable wing and the stationary wing;
   a first plasma actuator disposed on an upper surface of the stationary wing and a second plasma actuator disposed on a lower surface of the stationary wing, the first plasma actuator and the second plasma actuator being configured to control airflow through the slot;
   a control device configured to operate the first plasma actuator and the second plasma actuator under a condition corresponding to a steering angle of the movable wing,
   wherein the control device is configured to provide air flow for preventing air from flowing through the slot by operating the first plasma actuator and the second plasma actuator when the steering angle of the movable wing is zero.

2. The wing structure according to claim 1, wherein the controller is configured to form air flow from the upper surface of the stationary wing toward the lower surface of the movable wing through the slot by operating the first plasma actuator disposed on the upper surface of the stationary wing, while not operating the second plasma actuator disposed on the lower surface of the stationary wing when the steering angle of the movable wing is negative.

3. The wing structure according to claim 1, wherein the control device is configured to form air flow from the lower surface of the stationary wing toward the upper surface of the movable wing through the slot by operating the second plasma actuator disposed on the lower surface of the stationary wing, while not operating the first plasma actuator disposed on the upper surface of the stationary wing when the steering angle of the movable wing is positive.

4. The wing structure according to claim 1, wherein the movable wing is mechanically controlled by only an actuator configured to control the steering angle of the movable wing.

5. The wing structure according to claim 1, wherein the wing structure is a main wing structure and the movable wing is a flap.

6. An aircraft comprising the wing structure according to claim 1.

7. A method of controlling a wing structure of an aircraft, the aircraft comprising a stationary wing, a movable wing disposed so as to form a slot between the movable wing and a stationary wing, and at least one plasma actuator, the at least one plasma actuator comprising a first plasma actuator disposed on an upper surface of the stationary wing and a second plasma actuator disposed on a lower surface of the stationary wing, the first plasma actuator and the second plasma actuator being configured to control airflow through the slot,
   wherein the method includes preventing air from flowing through the slot by operating the first plasma actuator and the second plasma actuator when a steering angle of the movable wing is zero.

8. The method of controlling a wing structure according to claim 7, further comprising determining an alternating current voltage waveform to be applied between electrodes of either the first plasma actuator or the second plasma actuator as a burst waveform having a burst frequency or a burst period.

9. The method of controlling a wing structure according to claim 7, further comprising forming air flow from the upper surface of the stationary wing toward the lower surface of the movable wing through the slot by operating the first plasma actuator disposed on the upper surface of the stationary wing, while not operating the second plasma actuator disposed on the lower surface of the stationary wing when the steering angle of the movable wing is negative.

10. The method of controlling a wing structure according to claim 7, further comprising forming air flow from the lower surface of the stationary wing toward the upper surface of the movable wing through the slot by operating the second plasma actuator disposed on the lower surface of the stationary wing, while not operating the first plasma actuator disposed on the upper surface of the stationary wing when the steering angle of the movable wing is positive.

11. The method of controlling a wing structure according to claim 7, further comprising mechanically controlling an actuator configured to control the steering angle of the movable wing.

12. A wing structure used for an aircraft, comprising:
   a stationary wing;
   a movable wing disposed so as to form a slot between the movable wing and the stationary wing;
   a first plasma actuator disposed on an upper surface of the stationary wing and a second plasma actuator disposed on a lower surface of the stationary wing, the first plasma actuator and the second plasma actuator being configured to control airflow through the slot;
   a control device configured to operate the first plasma actuator and the second plasma actuator under a condition corresponding to a steering angle of the movable wing,
   wherein the control device is configured to form air flow from the upper surface of the stationary wing toward the lower surface of the movable wing through the slot by operating the first plasma actuator disposed on the upper surface of the stationary wing, while not operating the second plasma actuator disposed on the lower surface of the stationary wing when the steering angle of the movable wing is negative.

* * * * *